T. J. W. BROWN.
PIN FASTENER.
APPLICATION FILED AUG. 20, 1921.

1,433,173.

Patented Oct. 24, 1922.

Inventor
Thomas J. W. Brown
By Wm E Dyre
Attorney

Patented Oct. 24, 1922.

1,433,173

UNITED STATES PATENT OFFICE.

THOMAS J. W. BROWN, OF WASHINGTON, DISTRICT OF COLUMBIA.

PIN FASTENER.

Application filed August 20, 1921. Serial No. 493,836.

*To all whom it may concern:*

Be it known that I, THOMAS J. W. BROWN, a citizen of the United States, residing at Washington, in the District of Columbia, have invented certain new and useful Improvements in Pin Fasteners; and I do hereby declare the following to be a full, clear, and exact description of the invention, such as will enable others skilled in the art to which it appertains to make and use the same.

This invention relates to improvements in pin fasteners.

An object of the present invention is to produce a comparatively simple and readily usable unitary pin fastening device, wherein fabrics and other materials can be effectively united against separation in a smooth and unpuckered manner.

Another object of the invention is to provide a pin fastener wherein the neat appearance of the fastener is an important factor in that both the head and point of the pin are concealed from view upon at least one side of the united portions of the material.

A further object of my invention is to produce an easily manufactured and comparatively inexpensive pin fastener which can be retained in at least one of the portions of the materials to be united without danger of loss and without further manipulation of the pin as is now the case.

Other advantages such as a material reduction in the possibility of injury through sticking or scratching will be obvious.

In the accompanying drawings wherein similar reference characters designate corresponding parts in the several views:—

Figure 1:
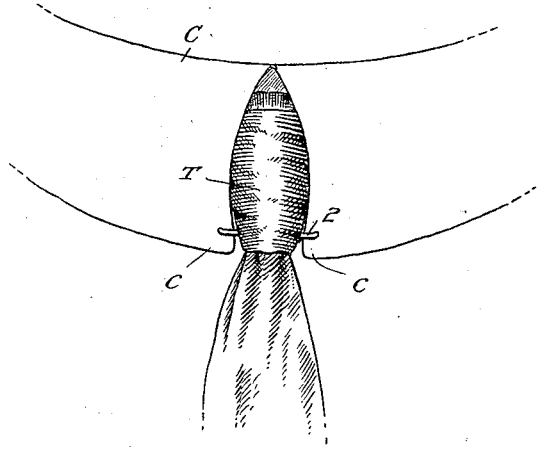
Fig. 1 is a view of my improved pin fastener as applied and in use for joining the ends of what is commonly referred to as a soft collar.

My present pin has been designed with a view to increasing the permanency of the ordinary pin fastening, and at the same time produce an appearance which will be pleasing to the æsthetic tastes. As shown I have applied my pin fastener to the joining of the usual separated free ends or flaps of soft collars. It will be understood however that I do not limit myself to such use, as my improved pin is readily applicable to any and all uses requiring the joining or uniting of fabrics as well as many other materials.

Referring to the drawings, I have illustrated a soft collar C, the lower corners c—c of which are united by the pin fastener indicated at 1. It is usual to join the corners c—c with the fastening device behind the knotted portion of the tie T as shown.

The pin 1 is formed of any suitable material, and as will be understood can be varied in size and color for any particular use required. It is usual to form the shank 2 of the pin of an appropriate length, and provide at one end of the shank a curved or crooked end 3, and at the other end of the shank a curved or crooked portion 4 immediately adjacent the penetrating point 5. The respective crooked portions are preferably of U-shape, the end 4 however forming substantially a hook over which the material can be easily passed. A head 6 is preferably formed upon the crooked end 3 as shown. The length of the crooks at each end may be varied as will be understood and the size thereof may be changed to accommodate relatively thick or thin materials.

Figure 3:
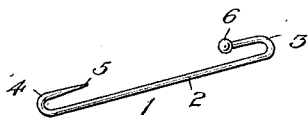
Fig. 3 is a detached perspective view of the pin fastener.

In use the pin is applied by inserting the penetrating point 5 through one end of the material, and pushing the remainder of the pin therethrough until the crooked end 3 assumes the position shown in Fig. 3 of the drawings. The point at which the pin is inserted is preferably a short distance back from the edge of the material so that the head 6 of the pin lays against the inner face of the material and is concealed from view from the opposite side thereof.

Figure 2:
Fig. 2 is a horizontal sectional view of two ends of material showing my pin fastener uniting the same.

To join the other end of the material the penetrating point 5 is inserted at a point preferably corresponding to the distance selected from the edge of the opposite portion of the material. In practice it is comparatively easy to fasten the second material in the crooked end 4, in that the material can be grasped, hooked over the point 5 and immediately moved to the position shown in Fig. 2. In this position it will be seen that the point 5 is concealed from view, and that a particularly neat appearance is given to the collar. This is desirable in that the safety pins and other slip-over devices now used are unsightly and tend to pucker and distort the collar.

When unfastening the pin device, the material is moved out of the crooked end 4 and over the point 5. In use it will be seen that where it is desirable the pin can be left in the opposite portion of the material, without danger of slipping out and becoming lost. The pin can be completely removed by pushing the same through the material in a reverse direction as will be understood.

Fabrics and other materials can be united in many other ways than that illustrated herein, the edges of the materials being abutted, lapped, or otherwise associated as occasions require.

Such variations in the form of the shank and crooked ends may be resorted to as properly lie within the scope of my invention, and I do not limit myself to the exact disclosures herein.

I claim:

1. A pin fastener for collars and the like comprising a relatively straight one-piece shank having a crooked end portion forming the head of the pin, and another crooked end portion forming the penetrating point of the pin, both of said crooked end portions being arranged to lie parallel with said straight shank.

2. A one-piece pin fastener for collars comprising a shank having a curved end portion the continuation of which is adapted to lie parallel with said shank, a head on said end portion, another curved end portion provided on the said shank, the continuation of which is adapted to lie parallel with said shank, and a penetrating point formed on said last-mentioned curved portion, said point and said head being arranged in alinement with each other.

In testimony whereof I affix my signature, in presence of two subscribing witnesses.

THOMAS J. W. BROWN.

Witnesses:
HELEN G. REAGAN,
JAMES H. MARR.